United States Patent
Berg (12) 
(10) Patent No.: US 6,602,990 B1
(45) Date of Patent: Aug. 5, 2003

(54) PROCESS FOR THE PRODUCTION OF A POROUS CROSS-LINKED POLYSACCHARIDE GEL AND ITS USE AS A GEL FILTRATION MEDIA AND IN CHROMATOGRAPHY

(75) Inventor: Hans Berg, Flogstavägen (SE)

(73) Assignee: Amersham Biosciences AB, Uppsala (SE)

( * ) Notice: Subject to any disclaimer, the term of this patent is extended or adjusted under 35 U.S.C. 154(b) by 739 days.

(21) Appl. No.: 09/155,995

(22) PCT Filed: Apr. 7, 1997

(86) PCT No.: PCT/SE97/00578

§ 371 (c)(1),
(2), (4) Date: May 11, 1999

(87) PCT Pub. No.: WO97/38018

PCT Pub. Date: Oct. 16, 1997

(30) Foreign Application Priority Data

Apr. 11, 1996 (SE) .............................. 9601368

(51) Int. Cl.[7] .............................. C08B 37/04
(52) U.S. Cl. .............................. 536/3; 536/124
(58) Field of Search ...................... 536/3, 124

(56) References Cited

U.S. PATENT DOCUMENTS

| | | | | |
|---|---|---|---|---|
| 3,873,514 A | * | 3/1975 | Chu et al. | 536/120 |
| 4,535,010 A | * | 8/1985 | Axén et al. | 427/246 |
| 4,582,865 A | * | 4/1986 | Balazs et al. | 524/29 |
| 4,665,164 A | * | 5/1987 | Pernemalm et al. | 536/120 |
| 4,973,683 A | * | 11/1990 | Lindgren | 536/120 |
| 5,114,577 A | * | 5/1992 | Kusano et al. | 21/198.2 |
| 5,371,208 A | * | 12/1994 | Kozulic | 536/102 |
| 5,541,255 A | * | 7/1996 | Kozulic | 525/54.3 |
| 5,723,601 A | * | 3/1998 | Larsson | 536/120 |
| 5,767,196 A | * | 6/1998 | Kozulic | 525/53.3 |
| 5,785,832 A | * | 7/1998 | Chiari et al. | 204/469 |
| 5,837,747 A | * | 11/1998 | Soon-Shiong et al. | 522/26 |
| 5,840,877 A | * | 11/1998 | Kozulic | 536/25.4 |

FOREIGN PATENT DOCUMENTS

| EP | 0055235 | * | 6/1982 |
|---|---|---|---|
| WO | 9839094 | * | 9/1998 |

OTHER PUBLICATIONS

Eriksson, "Glycidol–Modified Gels for Molecular–Sieve Chromatography. Surface Hydrophilization and Pore Size Reduction," *Journal of Biochemical and Biophysical Methods*, 15(2), 105–110 (Nov., 1987).*

Ames et al.*

* cited by examiner

*Primary Examiner*—James O. Wilson
*Assistant Examiner*—Lawrence Crane
(74) *Attorney, Agent, or Firm*—Royal N. Ronning, Jr.; Stephen G. Ryan (57) ABSTRACT

A process for the production of a porous cross-linked polysaccharide gel and a gel obtainable by the following steps: a) preparing a solution or dispersion of the polysaccharide; b) adding a bifunctional cross-linking agent having one active site and one inactive site to the solution or dispersion from step a); c) reacting hydroxylgroups of the polysaccharide with the active site of the cross-linking agent; d) forming a polysaccharide gel; e) activating the inactive site of the cross-linking agent; f) reacting the activated site from step e) with hydroxylgroups of the polysaccharide gel, whereby cross-linking of the gel takes place. The cross-linked polysaccharide gel obtained can further be cross-linked by conventional methods, one or several times.

20 Claims, 4 Drawing Sheets

PROCESS FOR THE PRODUCTION OF A POROUS CROSS-LINKED POLYSACCHARIDE GEL AND ITS USE AS A GEL FILTRATION MEDIA AND IN CHROMATOGRAPHY

The present invention relates to a process for the production of a cross-linked polysaccharide gel with improved qualities and a gel obtainable by the process and use thereof. More precisely the invention refers to a new method of cross-linking, in which a bifunctional crossing-linking agent is introduced into the polysaccharide solution before emulsion and gel formation.

Chromatographic methods are commonly used for separation and purification of molecules such as proteins, nucleic acids, polysaccharides etc. A wide variety of separation media is available, both inorganic material as well as synthetic polymers and polysaccharides.

Gel matrices of polysaccharides have long been used as separation media due to their good qualities and such matrices are now standard equipment in biochemistry laboratories. The polysaccharides are inert to biomolecules under a wide range of conditions. The polysaccharides are natural materials and as such are approved of by authorities (such as the Food and Drug Administration (FDA)in USA) for many fields of application. When using chromatographic separation methods, there can be left traces of the separation medium left in the separated product. When polysaccharides are used, as separation medium, this is harmless, as the material is not toxic.

Generally, chromatographic separations are carried out in columns packed with the separation matrix in form of particulate beads. Separation media of a fast kinetics with rapid flow rates results in a high productivity and may be achieved by a reduction of the particle size. However, small beads result in a higher back pressure due to the narrowing of the convective flow channels between the particles in a packed bed. To be able to separate large molecules the particles should have large pores,but large pores may result in a weakened structure of the particles. As the polysaccharides are soft materials the particles may easily collapse, especially at high flow rates. Thus, there is a demand on methods of manufacturing more stable polysaccharide particles. It is well known to increase the stability of polysaccharide particles by cross-linking the polymer. The cross-linking process stabilises the polysaccharide gel matrices by chemically binding the polymer chains with each other at their respective free hydroxyl groups. The cross-linking takes place between the hydroxyl and the functional groups of the cross-linkers. This affects the particle rigidity, but to a lesser extent or not at all the size of the pores. There are several patents and articles disclosing different cross-linking methods. Well known cross-linking agents are epichlorohydrin, bis-epoxides, divinyl sulphone.

In EP 203 049 it was found that the rigidity of the polysaccharides was considerably improved when the cross-linking agent used was monofunctional but also contained an additional masked functional group that could be activated later. The cross-linking was made in two steps. First the polysaccharide was derivatized with the monofunctional group. Then, in a next step the masked group was activated and made to react with the hydroxyl groups of the polysaccharide. In this manner the length of the cross-linking was controlled and the desired rigidity obtained.

The common characteristic for the state of the art methods is that the cross-linking is made on the polysaccharide polymer after the formation of the gel particles. Thus, the cross-linking is made on the ready made structure. Particles of e.g. agarose are prepared by dissolving the agarose in water by heating. The hot water solution is then emulsified to form spherical particles in an organic solvent such as toluene. The particles are precipitated after cooling. The particles are then cross-linked. By varying the concentration of the agarose solution, different pore sizes can be obtained. The lower the concentration of the agarose solution the larger pores are obtained.

The object of the present invention was to obtain an improved process for the production of a cross-linked polysaccharide gel.

A further object of the invention was to produce rigid polysaccharide gel particles with improved capability to withstand high flow rates/back pressures, but with retained separation qualities.

The objects of the invention are achieved by the process and the polysaccharide gel as claimed in the claims. According to the invention a process for the production of a porous cross-linked polysaccharide gel is obtained, which process is characterized by the following steps:

a) preparing a solution or dispersion of the polysaccharide,
b) adding a bifunctional cross-linking agent having one active site and one inactive site to the solution or dispersion from step a),
c) reacting hydroxyl groups of the polysaccharide with the active site of the cross-linking agent,
d) forming a polysaccharide gel,
e) activating the inactive site of the cross-linking agent,
f) reacting the activated site from step e) with hydroxyl groups of the polysaccharide gel, whereby cross-linking of the gel takes place.

According to a further aspect of the invention a porous cross-linked polysaccharide gel is obtainable by the following steps:

a) preparing a solution or dispersion of the polysaccharide,
b) adding a bifunctional cross-linking agent having one active site and one inactive site to the solution or dispersion from step a),
c) reacting hydroxyl groups of the polysaccharide with the active site of the cross-linking agent,
d) forming a polysaccharide gel,
e) activating the inactive site of the cross-linking agent,
f) reacting the activated site from step e) with hydroxyl groups of the polysaccharide gel, whereby cross-linking of the gel takes place.

With the present invention it was surprisingly found that gels with increased pressure/flow capacities of more than 300% could be obtained, compared with known gels. It was possible to manufacture highly rigid gel particles also with small particle diameters (about 10 $\mu$m).

According to the new method of the invention the cross-linking agent, is introduced into the polysaccharide solution or dispersion before the gel formation. The cross-linking agent is a bifunctional agent with one active site and one inactive site. When added to the polysaccharide solution or dispersion the active site of the agent is allowed to react with the hydroxyl groups of the polysaccharide. Thereby the cross-linking agent is chemically bound to the polymer chains before the gel formation process is started. In this manner an internal cross-linking agent is introduced into the polysaccharide.

In the first step of the process a solution or dispersion of the polysaccharide is formed. Solvents or dispersing agents commonly used together with polysaccharides can be used such as acetone, acetonitrile, dimethyl sulphoxide, dimethylformamide, pyridine, sec. and tert. alcohols, such as isopropanol, etc. However, according to a preferred embodiment of the invention an aqeous solution of the polysaccharide is used.

After the introduction of the cross-linking agent a gel is formed of the polysaccharide. If water has not been used as the solvent, the solvent or dispersing agent is then disposed of and the polysaccharide is dissolved in water. The gel is formed by emulsifying the water solution in an organic solvent such as toluene or heptane. Then, the inactive site of the cross-linking agent is activated and reacted with hydroxyl groups of the polysaccharide, whereby the gel is cross-linked.

The cross-linked gel can be further cross-linked by conventional methods as known by the state of the art. This further cross-linking can be made one or several times depending on how rigid particles that are required. The conventional cross-linking can also be made on the gel from step d) before or at the same time as activating and reacting of the inactive site of the cross-linking agent in steps e) and f). In a further embodiment of the invention steps b) and c) can be repeated one or several times after steps d) or e) in order to add more cross-linking agent before performing steps e) and f) or step f).

The bifunctional cross-linking agent used according to the invention comprises one active site and one inactive. With active site is meant all groups capable of reaction with the hydroxyl groups of the polysaccharide. Examples of such groups are halides, epoxides, methylol groups. The inactive site is a group which does not react under the reaction conditions for the reactive site but can later on be activated to react with the hydroxyl groups of the polysaccharide. Groups containing double bonds such as allyl, vinyl, acryl groups are suitable. The group connecting the active and inactive site is not essential, it should however, lack binding activity and not be too long. Preferable cross-linking agents are allylglycidyl ether and allylhalides, preferably allylbromide, but it is also possible to use e.g. N-methylol acrylamide, vinyl benzylchloride, cinnamoyl chloride. The reactions between the hydroxyl groups and the active site and the activated inactive site, as well as the activation of this site, is well known chemistry per see.

The reaction with the bifunctional cross-linking agent could be illustrated on agarose (AG) with the following reaction formulae:

Reaction with the active site of allylglycidyl ether:

Activation and reaction of inactive site:

The further cross-linking by conventional methods can be obtained by any of the known cross-linking agents. Suitable compounds are one or several from the group of epihalohydrin, bis-epoxides, divinylsulphone, allylglycidyl ether and dibromopropan-1-ol. Thus, the conventional cross-linking can be made with the same cross-linker as in the internal first cross-linking step or with another cross-linker or with a mixture of cross-linkers.

The process according to the invention can be used on all type of polysaccharides such as agarose, agarose derivatives, starch derivatives, dextran or derivatives thereof, alginate, carrageenan. However, agarose is the preferred one.

The gel matrix according to the invention is preferably prepared as particles. The manufacture of the gel is made with well known methods. Agarose for example, is dissolved in water by heating the solution above the gel point for agarose. The cross-linking agent is added to the hot aqueous agarose solution and the active site of the agent is allowed to react with the hydroxyl groups of the agarose. The agarose solution is then emulsified in an organic solvent such as toluene. The gel particles are precipitated by cooling. Thereafter, the inactive site of the cross-linking agent is activated and reacted with hydroxyl groups of the agarose particles, whereby the gel is cross-linked.

The size of the particles is determined by the stirring speed when emulsifying the agarose solution. The final required particle size is obtained by sieving. The pore sizes are regulated e.g. by varying the polysaccharide concentration. The process according to invention can be used to manufacture polysaccharide particles with conventional diameters and pore sizes. For the production of agarose particles the concentration suitably is from 0.5–20% by weight, preferably from 1–12% by weight. The particle diameters can be from 1 mm–1 $\mu$m, preferably from 500 $\mu$m –1 $\mu$m, most preferably 200 $\mu$m–1 $\mu$m.

With the invention it is possible to produce highly rigid polysaccharide particles. The major parameter that influences the rigidity is the amount of added cross-linker, even if also the polysaccharide concentration has a significance for the rigidity and not only for the pore size as mentioned above. To obtain rigid particles the cross-linker concentration should preferably be within the range 30–80 $\mu$mols/g gel, most preferably 45–60 $\mu$mols/g gel. A concentration lower than 30 $\mu$mols/g tends to give gels with relatively low pressure/flow capacities. A concentration above 80 $\mu$mols/g can result in gels which shrink to much to be acceptable.

The porous cross-linked polysaccharide gel according to the invention can be used as a gel filtration medium in which the molecules are separated according to differences in their size. They can also be used, after modification, in different types of affinity chromatography. The gel can be substituted with a lot of different groups in per see known manners. Among such groups can be mentioned:

1. Positively charged groups (primary, secondary, tertiary or quaternary amino groups),
2. Negatively charged groups (e.g. carboxy, phosphonic acid, sulphonic acid etc.)
3. Amphoteric groups
4. Groups with specific affinity (e.g. such as between IgG-binding protein (protein A, G, L etc.) and IgG, lectin and carbohydrate, antigen/hapten and antibody, (strept)avidin and biotin, 5. Complementary nucleic acids/oligonucleotides,
6. Groups with pi-electron systems
7. Chelating groups
8. Hydrophobic groups.

With these groups the matrix can then be used in affinity chromatography, ion exchange chromatography, hydrophobic interaction chromatography, reversed phase chromatography, covalent chromatography etc.

The invention will now be illustrated by the following examples which however are not intended to limit the invention. With parts and percent are meant parts by weight and percent by weight if not stated explicitly.

EXAMPLE 1

Preparation of Agarose Solution

An agarose solution is prepared in a batch reactor by adding 7 g agarose to 100 ml distilled water under stirring for 2 h at 950° C.

After 2 h of reaction the solution is cooled to 70° C. and 1 ml NaOH 45% and 1.67 ml allylglycidyl ether (AGE) are added to the agarose slurry. The reaction continues for 2 h under stirring at 70° C. The solution is then neutralised with 0.15 ml 60% acetic acid and HCl (pH=7–8).

Emulsion Media

The emulsion media is made in an emulsion reactor by adding 5.3 g ethyl cellulose (N-50 emulsifier) to 117 ml toluene under stirring at 60° C. (the dissolving of N-50 in toluene takes approximately 2 h).

Transfer of the Agarose Solution to the Emulsion Reactor

The agarose solution is transferred to the emulsion media. The stirring is regulated to 130 rpm. Agarose gel particles are thereby formed and their size can be controlled by variation of the rotation speed of the stirrer and the addition of extra N-50.

The desired maximal particle size is 150 $\mu$m. If the gel particles are too large the rotation speed can be increased up to 220 rpm and extra N-50 can be added. The maximal particle size is controlled by taking samples approximately every 10 min., which are analysed in a microscope with a built-in size graduation.

Once the 150 $\mu$m are reached, the solution is cooled down. The Cooling Process The solution is cooled from 60° C. to <25° C. in approximately 30 min.
Gel Washing Process The gel particles are washed under stirring with 1 l ethanol 99.5% which is decanted. The gel is then washed on a nutsch with 4×1 l ethanol 99.5% and 4×1 l distilled water. Activating of Inactive Site of Allylglycidyl Ether and Cross-linking of the Agarose=Cross-linking No.1 Bromination 10 g NaAc (sodium acetate) are added to a reactor containing a solution of 100 ml gel and 200 ml distilled water under stirring. After 5 min. bromine-water ($Br_2/H_2O$) is added to the solution until a dark yellow colour is obtained and maintained for over 1 min. The reaction continues for approximately 15 min. thereafter sodium formate is added, giving the gel a white colour. The gel is washed with 3×1 l distilled water.
Cross-linking 5 g $Na_2SO_4$ are added to a reactor containing a solution of 100 ml brominated gel and 100 ml distilled water under stirring. After 15 min. 10 ml NaOH 45% and 0.3 g $NaBH_4$ are added to the solution. The reaction continues for 3 h and then the temperature of the solution is increased to 40° C. and the reaction goes on for 16 h.

The gel is washed with distilled water until the pH=7. Further Cross-linking with a Conventional Method=Cross-linking No. 2

45.3 g $Na_2SO_4$ are added to a reactor containing a solution of 100 ml AGE cross-linked gel and 33.3 ml distilled water (75 gel slurry) under stirring. The reaction temperature is increased to 50° C. and after 2 h, 1.33 ml 45% NaOH and 0.4 g $NaBH_4$ are added to the solution as well as 9.33 ml NaOH 45% and 10 ml epichlorhydrin (ECH), which are added during a period of 6–8 h. The reaction continues over night (ca. 16 h). The gel is washed with distilled water and 60% acetic acid is added to obtain a pH=5–6.

The gel is then sieved to the desired particle size intervals (40–100 $\mu$m).

EXAMPLE 2

In this example particles are prepared, which are cross-linked twice by conventional methods after the cross-linking according to the invention. Thus, particles prepared according to example 1 were cross-linked with Cross-linking no. 2 method:

118 g $Na_2SO_4$ are added under stirring to a solution of 260 ml ECH cross-linked gel and 87 ml distilled water. The temperature is slowly increased to 50° C. and after 2 hours 3.5 ml NaOH 45% and 0.35 g $NaBH_4$ are added, while 24 ml NaOH 45% and 26 ml ECH are slowly pumped (6–8 hours) into the solution. The reaction is kept for 16 hours and then the gel is washed with distilled water (and 0.6 ml acetic acid) until pH≈5–6.

The gel is then sieved and tested.

EXAMPLE 3

As a comparable example agarose gel matrices allylated after the emulsion process are prepared. A synthesis method similar to the synthesis method described in example 1 for allylation before emulsion is used. These products have the same allyl concentration as those produced with the newly developed technique. The alternative synthesis method used to produce these gels consists of the following steps:
Emulsion 28 g agarose are added to 400 ml distilled water and heated to 95° C. for 2 hours. Thereafter the solution is cooled to 70° C. and transferred to a 60° C. warm solution containing 470 ml toluene and 35 g N-50 (emulsifier). After approximately 45 min. stirring an average particle size of 150 $\mu$m is obtained. The solution is cooled for about 30 min. to 22° C. and washed with absolute ethanol (4×2 l) and distilled water (4×2 l).
Allylation 33.5 g $Na_2SO_4$ and 1.8 g $NaBH_4$ are added to a solution containing 355 ml agarose gel and 106.5 ml distilled water. This solution is stirred for 5 min. at a temperature of 30° C. and then 25 ml AGE and 71 ml NaOH 45% are slowly pumped (6–8 hours) to the solution. The stirring continues for 16 hours at the same temperature. The allylated gel is washed with distilled water (3×2 l).
Bromination 36 g sodium acetate is added to a solution of 360 ml allylated gel and 720 ml distilled water. After 5 min. stirring, 146 ml $Br_2/H_2O$ is added to the solution and the reaction is run for 15 min. Then 0.5 g sodium formate is added and the gel obtained a white colour. The gel is washed with 3×2 gel volume of distilled water.
Cross-linking No. 1

18 g $Na_2SO_4$ is added to a solution of 360 ml brominated gel and 360 ml distilled water. The mixture is kept under stirring and after 15 min. 72 ml NaOH 45% is pumped (for 30 min.) into the solution together with 1.08 g NaBH$_4$. After 3 hours the temperature is increased to 40° C. and the reaction is held for 16 hours. The gel is then washed with distilled water until pH is about 7.

Cross-linking No. 2

156.4 g Na$_2$SO$_4$ is added to a solution containing 345 ml cross-linked gel and 115 ml distilled water. The solution is kept under stirring and slowly heated to 50° C. After 2 hours 4.6 ml NaOH 45% and 0.46 g NaBH$_4$ are added to the mixture while 32.2 ml NaOH 45% and 34.5 ml ECH are pumped for 6–8 hours to the solution. The reaction continues for 16 hours and then the gel is washed with distilled water (and 0.6 ml acetic acid) until pH is about 5–6. The gel is sieved and tested.

EXAMPLE 4
Extra Allylation of an Allylated Agarose Gel Matrix After Cross-linking No. 1

During the allylation process of the agarose solution, the bifunctional AGE molecule binds to the agarose polymer chains with its active site leaving its inactive site free. The free site is first brominated and during cross-linking no. 1 it is epoxidized with NaOH, enabling the AGE molecule to bind to a second agarose polymer chain. The alternative synthesis method here aims at coupling more AGE to the polymer chains by repeating the allylation process one more time before starting the first cross-linking as it is explained experimentally in the following steps:

Bromination 35 g sodium acetate is added to a solution of 350 ml allylated gel, prepared according to example 1, and 700 ml distilled water. The mixture is kept under stirring and after 5 min. 160 ml Br$_2$/H$_2$O are added. The reaction continues for 15 min. and then 0.5 g sodium formate is added. The gel colour changes to white and the gel is washed with distilled water (3×1 l).

Allylation 17.5 g Na$_2$SO$_4$, 0.5 g NaBH$_4$ and 35 ml NaOH 45% are added to a solution of 350 ml brominated gel and 175 ml H$_2$O. The mixture is held under stirring 40° C. and after 1 hour 20 ml AGE are added. The reaction continues for 16 hours after which the gel is washed with distilled water until pH is about 7.

Bromination 38.5 g sodium acetate are added to a stirred solution containing 385 ml gel allylated twice and 770 ml distilled water. After 5 min. 85 ml Br$_2$/H$_2$O are added and the reaction is kept for 15 min. and then 0.5 g sodium formate are added giving the gel a white colour. The gel is then washed with distilled water (3×1 l).

Cross-linking No. 1

19.25 g Na$_2$SO$_4$ are added to a stirred mixture containing 385 ml of the above mentioned brominated gel and 385 ml distilled water. After 15 min. 38.5 ml NaOH 45% is pumped to the solution (pumping period=30 min.) along with 1.16 g NaBH$_4$. The reaction continues for 45 min. before the temperature is increased to 40° C. The solution is kept under stirring for 16 hours. The gel is then washed with distilled water until pH is about 7.

Cross-linking No. 2

174.4 g Na$_2$SO$_4$ are added to a stirred solution of 385 ml cross-linked gel and 128 ml distilled water. The mixture is slowly heated to 50° C. and after 2 hours 5.13 ml NaOH 45% and 0.51 g NaBH$_4$ are added to the solution while 36 ml NaOH 45% and 38.5 ml ECH are slowly pumped (6–8 hours) into the reactor. The reaction continues for 16 hours, and then the gel is washed with distilled water (and 0.6 ml acetic acid) until pH=5–6.

The gel is sieved and tested.

EXAMPLE 5
Second Cross-linking Before the First Cross-linking

In this synthesis the ECH cross-linking is performed before cross-linking no. 1. The experimental procedure is explained in the following steps.

Cross-linking No. 2

An allylated gel is produced according to the method described in example 1. 158.8 g Na$_2$SO$_4$ are added to a solution containing 350 ml of this allylated gel and 117 ml distilled water. The mixture is stirred and slowly heated to 50° C. and after 2 hours 4.67 ml NaOH 45% and 0,67 g NaBH$_4$ are added to the solution while 32.7 ml NaOH 45% and 35 ml ECH are slowly pumped (6–8 hours) into the reactor. The reaction is held for 16 hours and then the gel is washed with distilled water until pH is about 5–6.

Bromination 20.5 g sodium acetate are added to a solution prepared from 205 ml ECH-cross-linked gel and 410 ml distilled water. The mixture is stirred and after 5 min. 70 ml Br$_2$/H$_2$O are added and after 15 min. reaction time 0.5 g sodium formate are added and the gel becomes white. The gel is then washed with distilled water (3×1 l).

Cross-linking No. 1

10.25 g Na$_2$SO$_4$ are added to a solution containing 205 ml brominated gel and 205 ml distilled water. The mixture is stirred for 15 min. and then 20.5 ml NaOH 45% and 0.61 g NaBH$_4$ are added. After 3 hours reaction time the temperature is increased to 40° C. and the solution is kept under stirring for another 16 hours. The gel is then washed with distilled water until pH is about 5–6.

The gel is sieved and tested.

The gels prepared in the examples were analysed with respect to allyl concentration, the pressure/flow capacities, $K_{av}$ values ($K_{av}$ is an accepted definition of the relative pore size) and particle size distribution accordingly:

Allyl Concentration Analysis

The allyl concentration was analysed on a Mettler DL40GP Memo Titrator with 0.1 M AgNO$_3$ according to standard methods.

The Pressure/flow Capacities Analysis

Instrument:

XK-16/40 column

HR 10/30 column

FPLCdirector™ system control unit (max. pressure/flow output:26–30 bar or 200–210 ml/min): a Pharmacia Biotech Controller LCC-501 Plus and two Pharmacia Biotech Pump P-6000 and PC-unit with built-in interface.

Method: The testing of pressure/flow resistance of a gel matrix depends on the gel average bead size and the column packing process. The gel beads produced have two average size intervals a) 8–12 $\mu$m b) 40–100 $\mu$m.

Packing a) The column packing process for gel beads with average size 8–12 $\mu$m is made in a HR 10/30 column with a series of pressure/time variations in the same manner as for Kav tests (see next paragraph).

b) The column packing process for gel beads with average size 40–100 $\mu$m is a free sedimentation process made in a XK 16/40 column with a bed height of 31±1 cm.

Pressure/Flow Test a) Tests on the HR-10/30 column are made by increasing the flow 0.1 ml/min every 5 min and reading the back pressure variation every 5 min.

b) Tests on the XK-16/40 column are made by increasing the flow 1 or 5 ml/min every 5 min and reading the back pressure variation every 5 min.

The Kav-values Determination Analysis

Instrument: Pharmacia UVM-detector Pharmacia Biotech FPLCdirector™ system control 2 channel recorder (plotting unit)

Method: The determination of the Kav-values of the gel matrix, results in an estimation of the pore size of the gel beads. The determination is made on the final product (the cross-linked gel). It is performed by graphic interpretation of the retardation time of several proteins, which have been injected into a column containing gel matrix.

Packing

The final product is packed in a HR 10/30 column under a pressure of 17 bar. The packing solvent used is a solution with the following composition:

60 g HAc+1 g Tween™ 20 per 1000 ml

To pack the column 30 g gel is dispersed in 30 g packing solvent.

The gel matrix is first packed under a pressure of 6 bars for 50 min then under 17 bars under 10 min.

Protein Injection and Kav Determination

The Kav-values are determined for four proteins:

Thyroglobulin (MW=669000 g/mol)

Ferritin (MW=440000 g/mol)

BSA (MW=67000 g/mol)

R-nase (MW=13700 g/mol)

These proteins are injected into the column one or two at the time (to prevent overlaps to occur).

The eluent media used during this procedure is a buffer solution with pH=7.2 and the following composition:

50 mM Sodium dihydrophosphate ($NaH_2PO_4 \times 2H_2O$)

150 mM Sodium chloride (NaCl)

0.02% Sodium azide ($NaN_3$)

To determine the Kav-values it is necessary to know the volume occupied by the void (volume around the agarose beads) which is done by injecting blue dextran into the column.

The obtained plots are interpreted and the data is analysed with a PC which calculates the desired Kav-values.

The Particle Size Distribution Analysis

The mean particle size distribution (d50v) was performed with a Coulter Multisizer.

The results from examples 1–5 are compared with a standard agarose gel (Sepharose®6FF) and presented in the following tables:

TABLE 1a

| Gel no. | Allyl conc. [μmol/g gel] | d50v [μm] | Pressure/Flow test | | |
|---|---|---|---|---|---|
| | | | Max flow [cm/h] | Max Pres. [bar] | Pressure Increase |
| | | | | | >1 bar* | >1.5 bar* |
| Seph.6FF | — | 91.1 | 1050 | 6.00 | 2.25 | 3.50 |
| Example 1 | 53 | 74.9 | 3450 | 17.25 | 12.00 | 14.25 |
| Example 2 | 53 | 74.9 | 4500 | 17.25 | 12.90 | 14.10 |
| Example 3 | 45 | 71.4 | 1500 | 13.00 | 4.00 | 5.25 |
| Example 4 | 46 | 77.2 | >6000** | 12.90 | >12.90 | >12.90 |
| Example 5 | 46 | 83.7 | 5250 | 18.80 | 13.90 | 15.10 |

*Pressure for which the pressure increase is over 1 or 1.5 bar when the flow is increased by 150 cm/h every 5 min.
**≧6000 cm/h indicates the maximal flow the instrument is capable of delivering. The maximal flow capacity of the gel lies above this value.

TABLE 1b

| Gel no. | Allyl conc. [μmol/g gel] | Kav | | | |
|---|---|---|---|---|---|
| | | Thyro | Ferritin | BSA | R-nase |
| Seph.6FF | — | 0.37 | 0.48 | 0.64 | 0.81 |
| Example 1 | 53 | 0.34 | 0.48 | 0.64 | 0.82 |
| Example 2 | 53 | 0.33 | 0.48 | 0.64 | 0.80 |
| Example 3 | 45 | 0.28 | 0.44 | 0.61 | 0.80 |
| Example 4 | 46 | 0.28 | 0.43 | 0.56 | 0.70 |
| Example 5 | 46 | 0.27 | 0.42 | 0.58 | 0.74 |

EXAMPLE 6

In this example the method according to the invention was used to prepare highly rigid agarose gel beads with 8.1 w/v % agarose. The process according to example 2 was repeated but when preparing the agarose solution 8.1 g agarose per 100 ml water was used. The gel was sieved and two fractions with two different particle sizes were obtained, Example 6a and 6b. A further particle size, Example 6c was produced according the same manner. The gel beads were tested in the same way as mentioned above. The prepared particles were compared with conventional particles with an agarose content of 8.1 w/v % (Superose®6 from Pharmacia) The test results are put together in tables 2a and 2b.

TABLE 2a

| Gel no. | Allyl conc. [μmol/g gel] | d50 v [μm] | Pressure/Flow test | |
|---|---|---|---|---|
| | | | Max flow [ml/min] | Max Pres [bar] |
| Superose 6 | — | 13.2 | 0, 9 | 15 |
| Superose 6 | — | 14.6 | 1, 2 | 17 |
| Example 6a | 59 | 9.2 | ≧1.7 | ≧26* |
| Example 6b | 59 | 12.6 | ≧2.5 | ≧26* |
| Example 6c | 57 | 11.2 | ≧2.5 | ≧26* |

*26 bar corresponds to the maximal pressure the instrument is capable of delivering. The maximal pressure and flow values obtained above are expected to be higher.

TABLE 2b

| Gel no. | Allyl conc. [μmol/g gel] | d50v [μm] | Kav | | | |
|---|---|---|---|---|---|---|
| | | | Thyro | Ferritin | BSA | R-nase |
| Superose 6 | — | 13.2 | 0.29 | 0.40 | 0.54 | 0.68 |
| Superose 6 | — | 14.6 | 0.36 | — | 0.60 | — |
| Example 6a | 59 | 9.2 | 0.24 | 0.37 | 0.50 | 0.68 |
| Example 6b | 59 | 12.6 | 0.26 | 0.39 | 0.52 | 0.68 |
| Example 6c | 57 | 11.2 | 0.21 | 0.34 | 0.47 | 0.63 |

In the following examples gels with different agarose content were produced:

EXAMPLE 7

The method according to example 1 was repeated but with different agarose contents. The result is disclosed in table 3a and 3b below. Example 7a with 7% agarose is identical with example 1.

EXAMPLE 8

In this example different agarose contents were used and the method according to example 5 was used. The result is disclosed in the tables below.

TABLE 3a

| Gel | Agarose [w/v %] | d50v [μm] | Pressure/Flow test | | Pressure Increase | |
|---|---|---|---|---|---|---|
| | | | Max flow [cm/h] | Max Pres. [bar] | >1 bar* | >1.5 bar* |
| Seph.4FF | 4 | 98.6 | 480 | 1.8 | — | — |
| Seph.6FF | 6 | 91.1 | 1050 | 6.0 | 2.25 | 3.5 |
| Example 7a | 7 | 74.9 | 3450 | 17.25 | 12.0 | 14.25 |
| Example 7b | 4 | 84.0 | 2250 | 9.00 | 5.45 | 6.60 |
| Example 8a | 7 | 78.4 | >6000** | 19.90 | >19.90 | >19.90 |
| Example 8b | 5 | 61.7 | 3150 | 16.80 | 9.55 | 12.30 |
| Example 8c | 4 | — | 2700 | 9.50 | 6.25 | 7.40 |
| Example 8d | 3 | 87.5 | 1800 | 4.5 | >4.5 | >4.5 |

*Pressure for which the pressure increase is over 1 or 1.5 bar when the flow is increased by 150 cm/h every 5 min.
**≧6000 cm/h indicates the maximal flow the instrument is capable of delivering. The maximal flow capacity of the gel lies above this value.

TABLE 3b

| Gel | Agarose [w/v %] | Kav | | | |
|---|---|---|---|---|---|
| | | Thyro | Ferritin | BSA | R-nase |
| Seph.4FF | 4 | 0.57 | 0.66 | 0.76 | 0.87 |
| Seph.4FF | 6 | 0.37 | 0.48 | 0.64 | 0.81 |
| Example 7a | 7 | 0.34 | 0.48 | 0.64 | 0.82 |
| Example 7b | 4 | 0.53 | 0.63 | 0.76 | 0.87 |
| Example 8a | 7 | 0.26 | 0.43 | 0.57 | 0.73 |
| Example 8b | 5 | 0.36 | 0.51 | 0.63 | 0.77 |
| Example 8c | 4 | 0.56 | 0.64 | 0.78 | 0.88 |
| Example 8d | 3 | 0.67 | 0.77 | 0.84 | 0.93 |

CONCLUSION

From the tables it can be seen that the use of the new cross-linking method according to the invention results in gels capable of withstanding more than three times higher flow than conventional gel particles or particles prepared according to known methods (Example 3), though the gels have similar $K_{av}$ values.

The excellent behaviour of the gels of the invention can also be illustrated as in FIGS. 1–3. In the figures:

FIG. 3a is a plot of the Kav values against the maximal flow for examples 7a, 7b, 8a, 8b, 8c, 8d and comparable compounds.

FIG. 3b is a plot of the flow against the back pressure for the same examples as in FIG. 3a.

From the figures it is evident that for the state of the art particles the back pressure raises quickly when the flow increases above a moderate value, which indicates collapse of the particles if the flow is increased too much. However, the pressure/flow plots for the gels according to the invention show a much lower inclination, indicating that the back pressure only raises slowly when the flow is increased.

Figure 1:
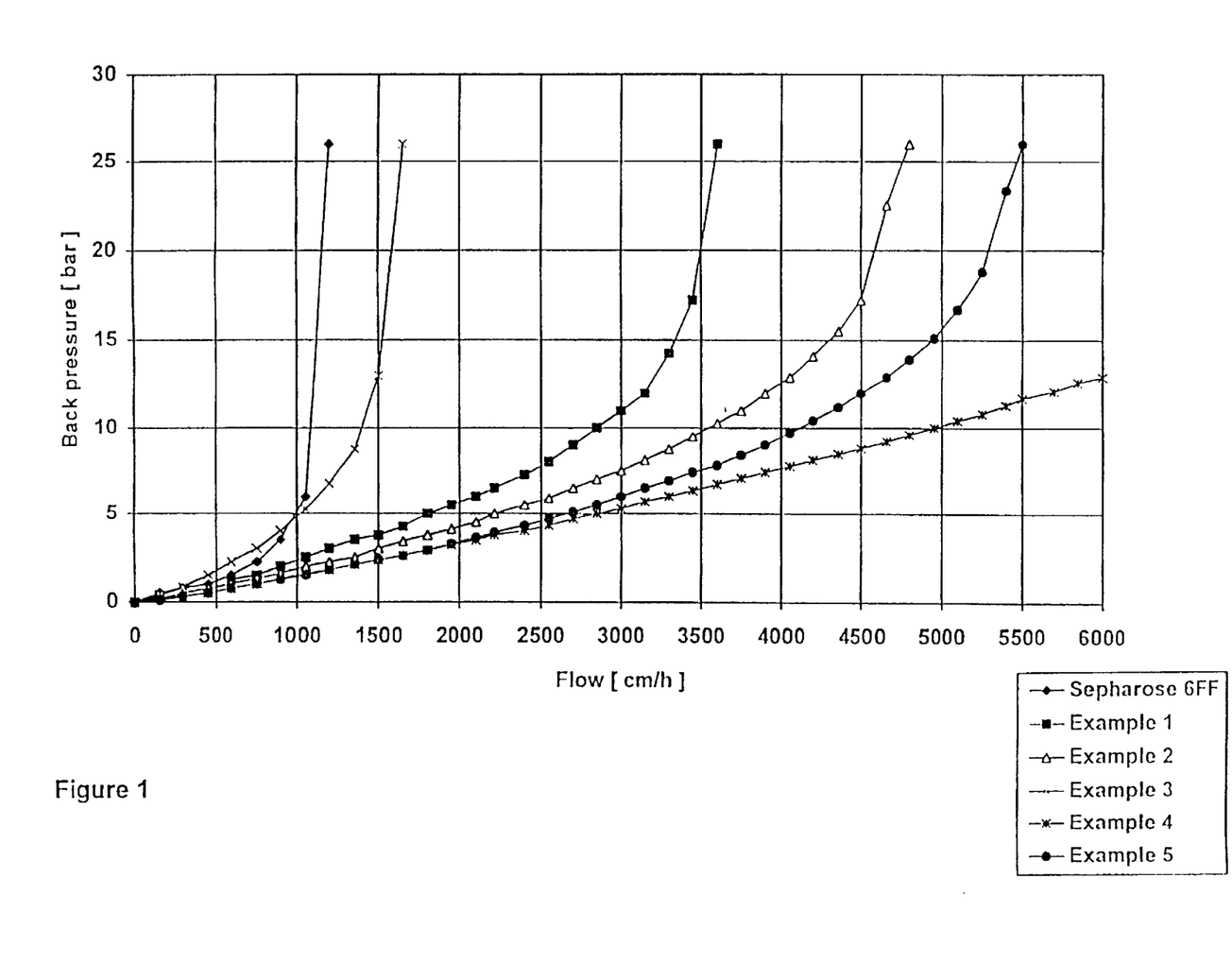
FIG. 1 is a plot of the flow against the back pressure of examples 1–5 and comparable compound.
Figure 2:
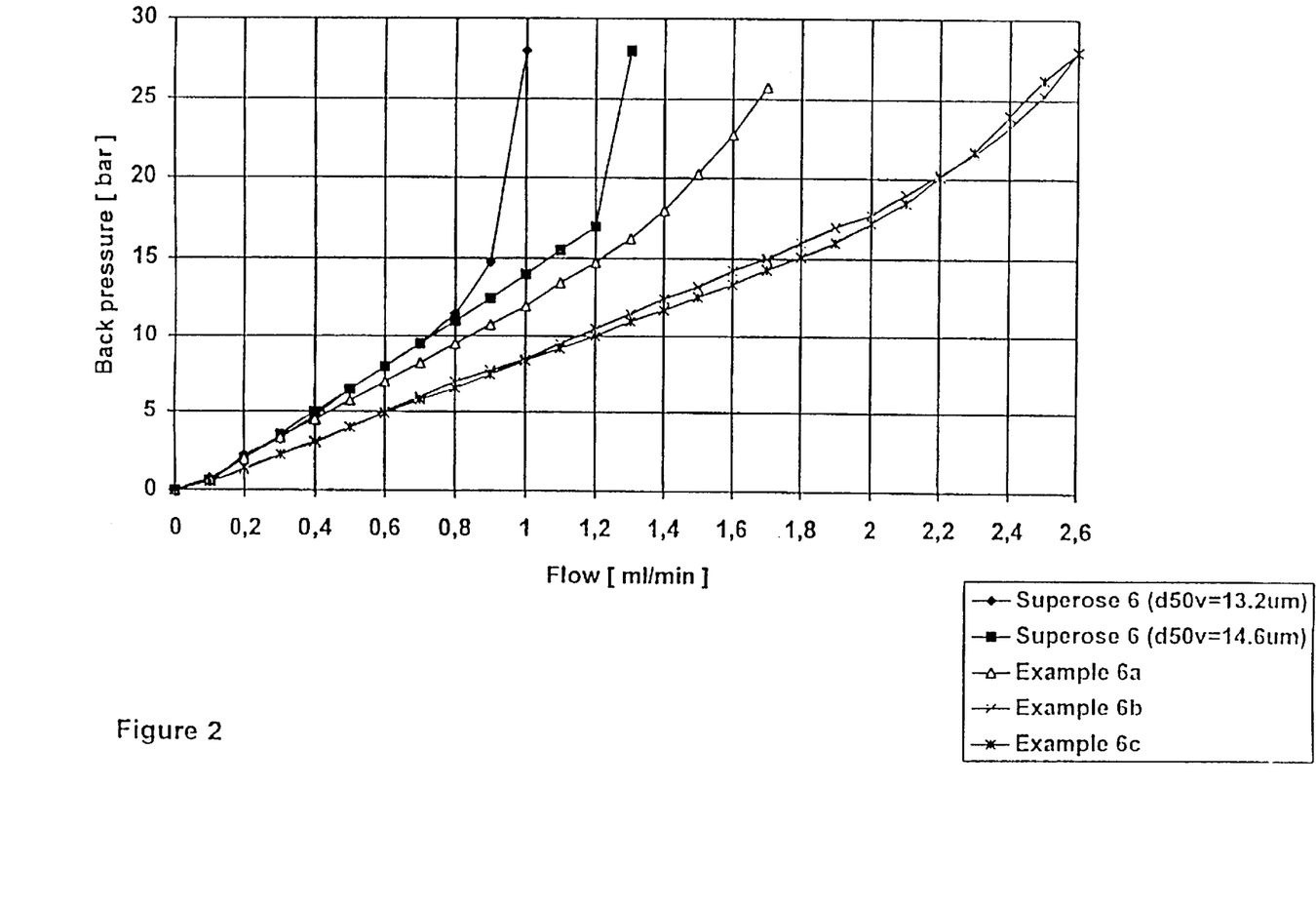
FIG. 2 is a plot of the flow against the back of examples 6a, 6b, 6c and comparable compound.
Figure 3:
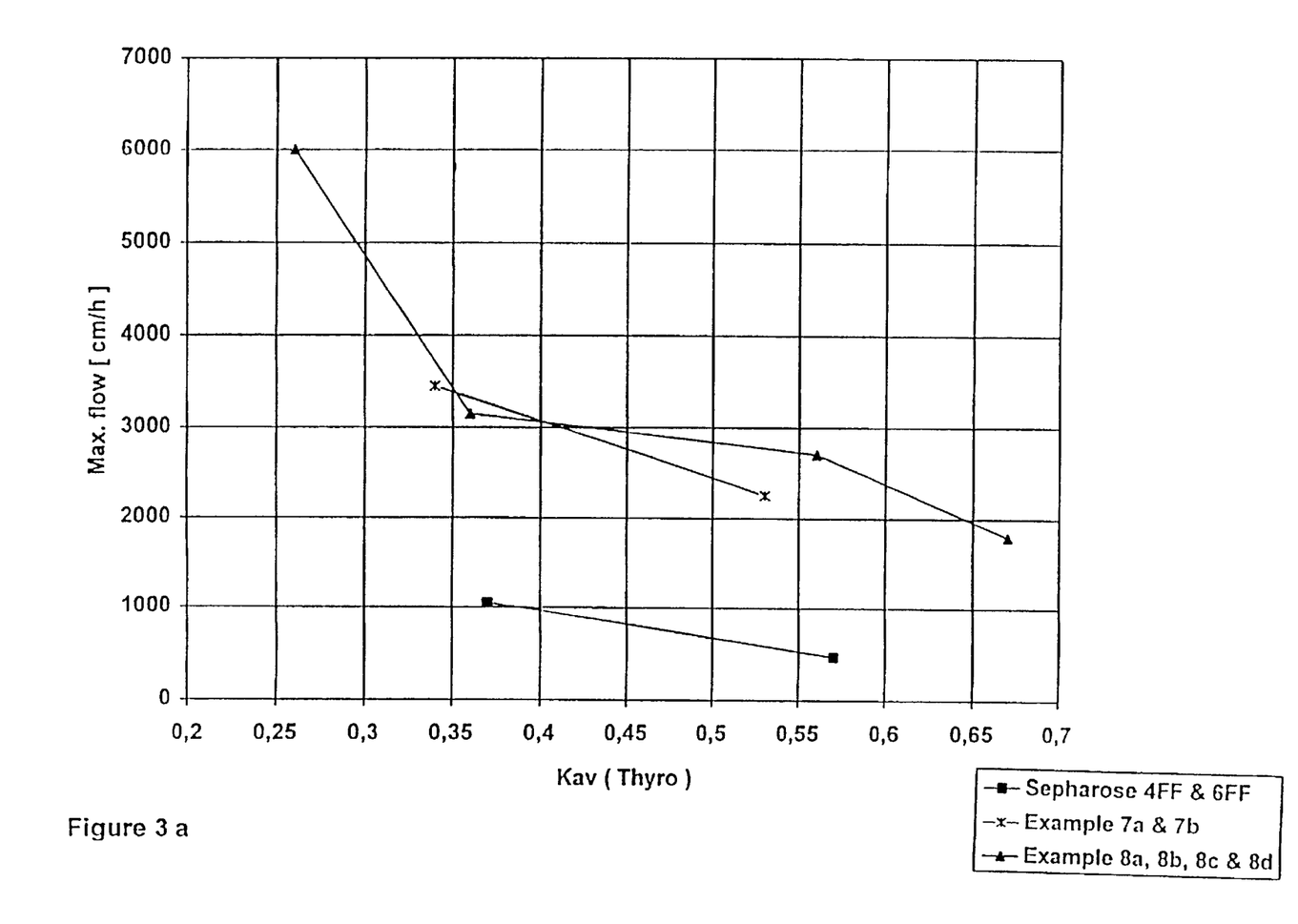
Figure 3B:
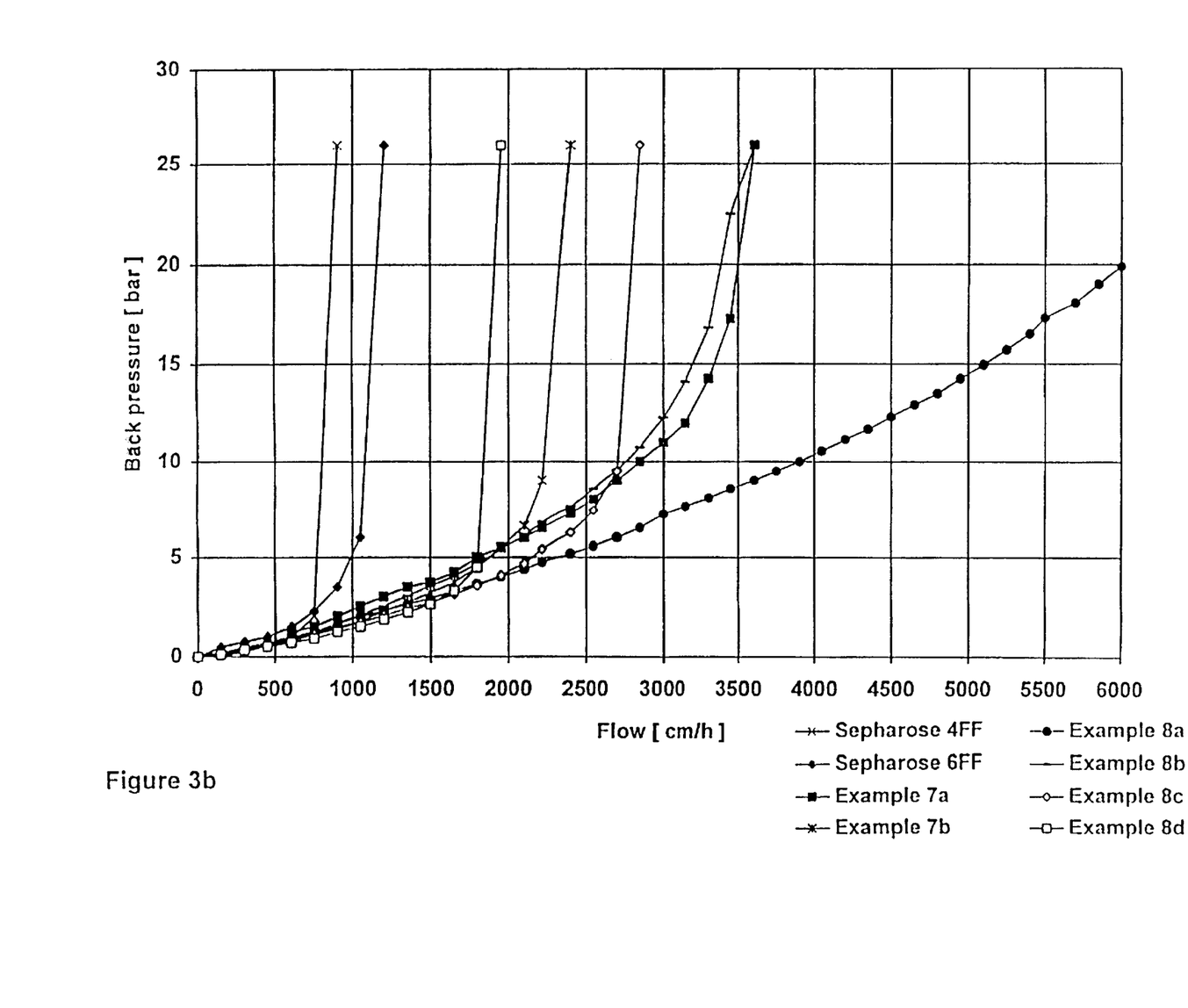

In FIG. 3a the Kav values for the gel matrices according to examples 7a, b and 8a, b, c, d has been plotted against the maximal flow. It is readily seen from the diagram that the maximal tolerated flow is increased by 300% for matrices produced according to example 7 or example 8, idenpendently from the agarose w/v percentage. However, the agarose w/v percentage has an important impact on the gel beads pore size, which is expressed by the Kav values, as they increase with the reducing amount of agarose in the gel beads.

What is claimed is:

1. A process for the production of a porous cross-linked polysaccharide gel, comprising the following steps:
   a) preparing a solution or dispersion of the polysaccharide,
   b) adding a bifunctional cross-linking agent having one active site and one inactive site to the solution or dispersion from step a),
   c) reacting hydroxylgroups of the polysaccharide with the active site of the cross-linking agent,
   d) forming a polysaccharide gel,
   e) activating the inactive site of the cross-linking agent,
   f) reacting the activated site from step e) with hydroxylgroups of the polysaccharide gel, whereby cross-linking of the gel takes place.

2. The process according to claim 1 further comprising cross-linking the polysaccharide gel by conventional methods.

3. The process according to claim 1, wherein the gel from step d) is cross-linked by conventional methods before performing steps e) and f).

4. The process according to claim 1, wherein the gel from step d) is cross-linked by conventional methods at the same time as performing steps e) and f).

5. The process according to claim 1, wherein steps b) and c) are repeated one or several times after steps d) or e) before performing steps e) and f) or step f).

6. The process according to claim 1, wherein an aqueous solution is prepared of the polysaccharide in step a).

7. The process according to claim 6, wherein the gel is formed by emulsifying the aqueous solution from step c) to particles, in an organic solvent.

8. The process according to claim 1, wherein the bifunctional cross-linking agent is allylglycidyl ether or allylbromide.

9. The process according to claim 1 wherein the further cross-linking by conventional methods is achieved by use of one or several compounds selected from the group consisting of epihalohydrin, bis-epoxides, divinylsulfone, allylglycidyl ether and dibromopropan-1-ol.

10. The process according to claim 1, wherein polysaccharide is agarose.

11. A porous, cross-linked polysaccharide gel obtainable by the following steps:
   a) preparing a solution or dispersion of the polysaccharide,
   b) adding a bifunctional cross-linking agent having one active site and one inactive site to the solution or dispersion from step a),
   c) reacting hydroxylgroups of the polysaccharide with the active site of the cross-linking agent,
   d) forming a polysaccharide gel,
   e) activating the inactive site of the cross-linking agent,
   f) reacting the activated site from step e) with hydroxylgroups of the polysaccharide gel, whereby cross-linking of the gel takes place.

12. The polysaccharide gel according to claim 11, wherein the cross-linked polysaccharide gel obtained is further cross-linked by conventional methods, one or several times.

13. The polysaccharide gel according to claim 1, wherein the gel from step d) is cross-linked by conventional methods before performing steps e) and f).

14. The polysaccharide gel according to claim 1, wherein the gel from step d) is cross-linked by conventional methods at the same time as performing steps e) and f).

15. The polysaccharide gel according to claim 1, wherein steps b) and c) are repeated one or several times after steps d) or e) before performing steps e) and f) or step f).

16. The polysaccharide gel according to claim 11, wherein an aqueous solution is prepared of the polysaccharide in step a).

17. The polysaccharide gel according to claim 16, wherein the gel is formed by emulsifying the aqueous solution from step c) to particles, in an organic solvent.

18. The polysaccharide gel according to claim 11, wherein the bifunctional cross-linking agent is allylglycidyl ether or allylhalide.

19. The polysaccharide gel according to claim 12, wherein the cross-linked polysaccharide gel obtained is further cross-linked, by one or several compounds selected from the group consisting of epihalohydrin, bis-epoxides, divinylsulphon, allylglycidyl ether and dibromopropan-1-ol.

20. The polysaccharide gel according to claim 11, wherein polysaccharide is agarose.

* * * * *